Patented Oct. 3, 1939

2,174,998

UNITED STATES PATENT OFFICE 2,174,998

AZO DYES FROM RING ACYLATED PHENOLS

Swanie S. Rossander, Wilmington, Del., and Harold E. Woodward, Penns Grove, N. J., assignors to E. I. du Pont de Nemours & Company, Wilmington, Del., a corporation of Delaware No Drawing. Application March 23, 1937, Serial No. 132,618

17 Claims. (Cl. 260—149)

This invention relates to azo dyes, produced by coupling diazotized aryl amines to hydroxy-arylketones, and especially to azo dyes in which the coupling component is a hydroxy-phenone wherein the hydrocarbon residue of the acyl group is an alkyl, aryl, or aralkyl group.

It has been found that valuable dyestuffs can be produced by coupling a diazotized aryl amine with hydroxy-phenones. The hydroxy-phenone nucleus of the new dyes consists of a di-hydroxy benzene nucleus having a free coupling position, preferably para or ortho to the hydroxy group. The hydrocarbon residue of the acyl group is aryl, aralkyl, or straight or branched chain alkyl.

It is an object of the invention to provide new azo dyestuffs. Another object of the invention is to provide azo compounds with improved fastness to fulling and perspiration. Another object of the invention is to provide methods of making the new dyestuffs. Still another object is to provide fibers dyed with the dyes and processes for dyeing the fibers.

The objects of the invention are accomplished generally by coupling a diazotized primary amine with an acyl derivative of a 1,3-di-hydroxy benzene in alkaline reaction medium and separating the colored product of coupling. Fibers or fabrics are dyed by adding the product of coupling to a dye bath and immersing the material to be dyed in the bath.

The invention is illustrated by the following examples but it is to be understood that the invention is not limited thereto.

Example I

A solution of benzene diazonium chloride was coupled in a solution alkaline with sodium carbonate with 1.1 equivalents of lauroyl resorcin at temperatures of 5° to 10° C. and the monazo color was separated from the solution. The product was yellow, insoluble in water and soluble in organic solvents. Its gasoline solution was yellow in color. Its probable formula is

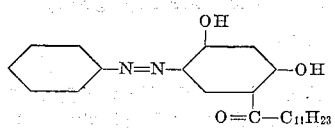

If, instead of lauroyl resorcin, an equivalent amount of the diketo compound from resorcin and sebacic acid, or of alpha-ethyl-hexoyl resorcin, or of 2:4-dihydroxy benzophenone or of 2:4-dihydroxy omega phenyl acetophenone is used, products similar in color and solubility are obtained. They may be represented by the following formulae

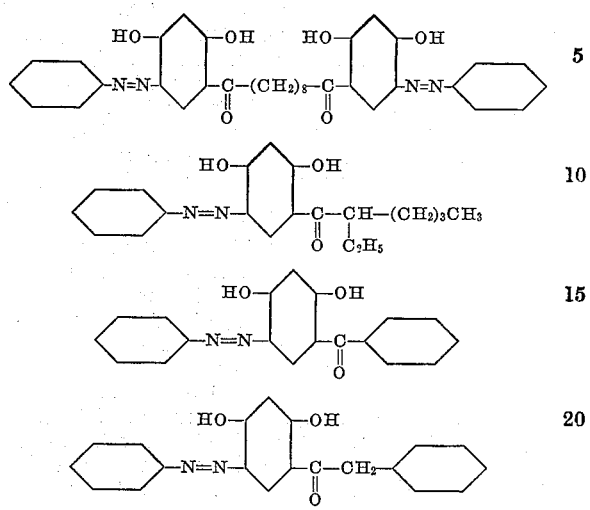

Example II 22.3 parts of 4-chlor-2-amino phenol-6-sulfonic acid were dissolved in 250 parts water with 50 parts of 2 normal sodium hydroxide solution. There were then added 75 parts of 2 normal hydrochloric acid solution and 50 parts of 2 normal sodium nitrite solution. After stirring ½ hour a clear dark yellow solution of the diazo compound was obtained. This was cooled to 10° C. and added to a cold solution containing 32 parts of lauroyl resorcin, 55 parts of 2 normal sodium hydroxide solution, 50 parts of 2 normal sodium carbonate solution and 250 parts of water. There was added during the next hour 50 parts of 2 normal sodium hydroxide solution. After another hour of stirring at 15°–20° C. the coupling was complete. The mixture was heated to 70° and the monazo dye was salted out by adding 50 parts of 2 normal hydrochloric acid and 100 parts of salt. After stirring 15 minutes it was filtered and dried. The yield was 82 parts of product which was a purple black powder sparingly soluble in water and soluble in solutions of alkalis. It dyed wool from an acetic acid bath a chocolate brown and from a sulfuric acid bath a yellow brown. When either dyeing was after-treated in the usual manner with dichromate a bordeaux shade was obtained. This was much superior to the corresponding color obtained when resorcin was used instead of lauroyl resorcin as to fastness to washing, fulling and alkaline perspiration. The probable formula is

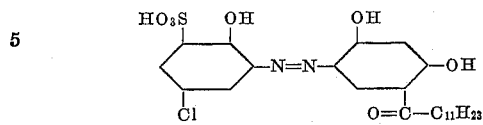

Example III 8.2 parts of the monazo compound obtained in

Example II was dissolved in 200 parts of water which contained 20 parts of 2 normal sodium hydroxide solution. It was heated to boiling and 2.4 parts of chromium fluoride dissolved in 100 parts of boiling water were added. The mixture was boiled under a reflux condenser for 24 hours. The chromium compound of the azo dye was salted out with 30 parts of salt, filtered and dried. The product was a purple black powder sparingly soluble in water and soluble in solutions of alkalis. It dyed wool a bordeaux shade which was fast to washing and alkaline perspiration.

Example IV 3.5 parts of sulfanilic acid were diazotized in the usual manner. The diazotized acid was added to a cold solution containing 6.1 parts lauroyl resorcin and 11 parts of 2 normal sodium hydroxide solution in 50 parts of water. Ten parts of 2 normal sodium carbonate were then added and the formation of the monazo dye was soon completed. The diazo compound made from 2.5 parts of meta xylidine was then added and followed by 20 parts of 2 normal sodium hydroxide solution. When the coupling was finished the disazo dye was salted out by adding 10 parts of 2 normal hydrochloric acid and 100 grams of salt. The product dyed wool about the same color as the corresponding color obtained when resorcin was used instead of lauroyl resorcin but it showed less bleeding when submitted to the usual tests for fastness such as washing and fulling. It also dyes leather an orange color. The probable formula is

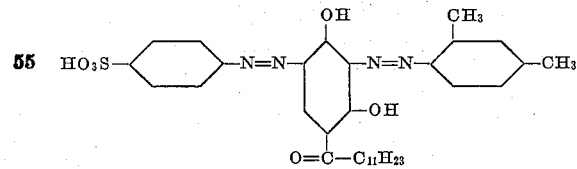

Example V

A disazo color was prepared by coupling tetrazotized benzidine with 1 equivalent of 2-naphthol-6,8-disulfonic acid and 1 equivalent of lauroyl resorcin. The product dyed tin weighted silk a bluish red of good discharge properties and good fastness to washing. The probable formula is

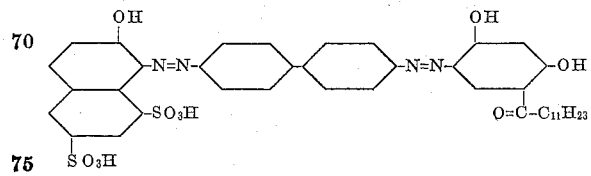

Example VI

A trisazo dye was made by coupling tetrazotized benzidine with 1 equivalent of salicylic acid and with 1 equivalent of a monazo dye made from diazotized sulfanilic acid and lauroyl resorcin as in Example IV. The product was a black powder slightly soluble in water and dyed silk a red brown color from acid solution. The probable formula is

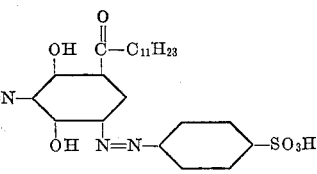

In the foregoing examples the

group consisted of groups in which R is a straight chain aliphatic residue. Instead of a straight chain aliphatic residue, R may be a branched chain aliphatic residue, aryl of one or more benzene nuclei, or aralkyl. The R group may be substituted by the various groups ordinarily used for substituent purposes, for example halogen, nitro, alkyl, alkoxy, carboxyl, and sulphonic acid groups. If R is alkyl it may be substituted additionally with hydroxy and sulphato.

The hydroxy-phenyl nucleus may be substituted with the usual substituents and with amino groups, as long as all the coupling positions are not blocked.

Poly azo combinations as well as monazo combinations with the described coupling component are made, for example, disazo, trisazo and tetrakisazo combinations, and one mol of the coupling component containing more than one free coupling position can be coupled with more than one azo component. The azo component may be a diazotized primary aryl amine or a tetrazotized diamino compound. Water solubility of the compounds can be varied and produced by water solubilizing groups, such as sulphonic acid and carboxylic in the diazo components. These soluble dyes are useful for dyeing animal fibers, such as silk, wool and leather.

The dyes may be modified by treating them with an alkylating agent, such as di-methyl sulphate, an acid halide, such as p-toluene sulphon halide, or a nitro-benzoyl halide, and certain of the compounds can be treated with salts of heavy metals to form metal complexes.

When the diazo component contains a hydroxy or carboxy group ortho to the amino group, the coupled compounds may be treated with salts of heavy metals, either before or after they are disposed on the fiber. For example, chromium and copper complexes of the dyes are produced in this manner as illustrated in Example III.

The dyes in which the acyl group

is a straight chain aliphatic residue of the type —$C_nH_{2n+1}$ containing at least six carbon atoms and containing a solubilizing group in the azo component are preferred, especially those containing 8 to 15 carbon atoms. For example, the dyes containing eleven carbons in the straight chain aliphatic residue have given excellent results, especially those in which a ring acylated 1,3-di-hydroxy-benzene is used as the nucleus of the coupling component, for example the dye produced by coupling a diazotized o-amino-phenol-sulphonic acid to lauroyl resorcin.

In making the dyes, many variations in the reaction media, such as temperature, concentration and pH value can be made as understood by those skilled in the art. Still other widely different embodiments of the invention will be apparent to those skilled in the art without departing from the spirit and scope of the invention, and it is to be understood that no limitations are intended except such as are specifically recited in the claims or are imposed by the prior art.

We claim:

1. A compound represented by the formula

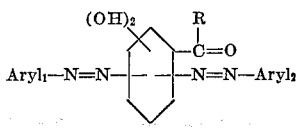

in which Aryl$_1$ and Aryl$_2$ are each one of a group consisting of the residues after diazotization of primary aryl amines, and R is the radical of one of a group consisting of straight and branched chain aliphatic hydrocarbons having at least 6 carbon atoms, aryl and aralkyl.

2. A compound represented by the formula

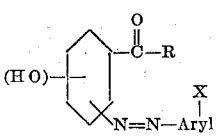

in which R is an aliphatic radical containing 8 to 15 carbons, Aryl is the radical of an aryl compound which contains at least one nucleus from the group consisting of benzene and naphthalene compounds and X is at least one of the group consisting of hydroxy, carboxyl and sulfonic acid.

3. The compounds, being the products of coupling azotized primary aryl amines with a dihydroxy phenone, and comprising as one component the residue of a dihydroxy phenone represented by the formula

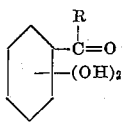

in which R is selected from the radicals consisting of straight and branched chain aliphatic hydrocarbons having at least 6 carbon atoms, aryl and aralkyl; the azo components being the residues of said primary aryl amines.

4. The compounds, being the products of coupling azotized primary aryl amines with a dihydroxy phenone, and comprising as one component the residue of a dihydroxy phenone represented by the formula

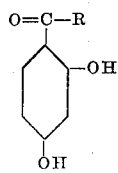

in which R is selected from the radicals consisting of straight and branched chain aliphatic hydrocarbons having at least 6 carbon atoms, aryl and alkyl; the azo components being the residues of said primary aryl amines.

5. The compounds, being the products of coupling azotized primary aryl amines with a dihydroxy phenone, and comprising as one component the residue of a dihydroxy phenone represented by the formula

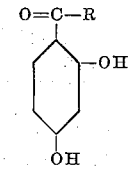

in which R is selected from the radicals consisting of straight chain aliphatic hydrocarbons having six to seventeen carbon atoms; the azo components being the residues of said primary aryl amines.

6. The compounds, being the products of coupling azotized primary aryl amines with a dihydroxy phenone, and comprising as one component the residue of a dihydroxy phenone represented by the formula

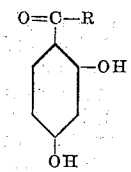

in which R is selected from the radicals consisting of straight chain aliphatic hydrocarbons having eight to fifteen carbon atoms; the azo components being the residues of said primary aryl amines.

7. The compounds, being the products of coupling azotized primary aryl amines with a dihydroxy phenone, and comprising as one component the residue of a dihydroxy phenone represented by the formula

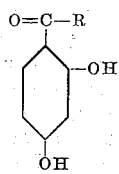

in which R is selected from the radicals consisting of straight chain aliphatic hydrocarbons having eleven carbons; the azo components being the residues of said primary aryl amines.

8. The compounds, being the products of coupling diazotized o-amino-phenol-sulfonic acid with a dihydroxy phenone, and comprising as the coupling component the residue of a phenone represented by the formula

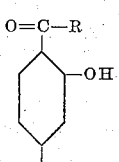

in which R is selected from straight and branched chain alkyl radicals having at least six carbons.

9. The compounds, being the products of coupling diazotized chlor-amino-phenol sulfonic acid with a dihydroxy phenone, comprising as the coupling component the residue of a phenone represented by the formula

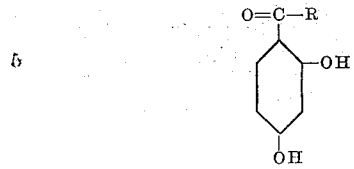

in which R is selected from straight and branched chain alkyl radicals having at least six carbons.

10. The compounds, being the products of coupling diazotized chlor-amino-phenol sulfonic acid with a dihydroxy phenone, comprising as the coupling component the residue of a phenone represented by the formula

in which R is selected from straight chain aliphatic hydrocarbon radicals having eight to fifteen carbon atoms.

11. The dyestuff metal-complexes which comprise a heavy metal and the products of coupling containing the residues of azotized primary aryl amines in which one of a group consisting of hydroxyl and carboxyl is substituted ortho to the azo bridge, said coupling products containing the residue of a dihydroxy phenone represented by the formula

in which R is selected from the group consisting of straight and branched chain aliphatic hydrocarbons having at least six carbons, aryl and aralkyl, said complexes being produced by heating said products of coupling in an alkaline medium with a salt of said metal until a metal-complex of the product of coupling is formed.

12. The dyestuff metal-complexes which comprise a heavy metal and the products of coupling containing the residues of azotized primary aryl amines in which one of a group consisting of hydroxyl and carboxyl is substituted ortho to the azo bridge, said coupling products containing the residue of a dihydroxy phenone represented by the formula

in which R is selected from the group consisting of straight and branched chain aliphatic hydrocarbons having at least six carbons, aryl and aralkyl, said complexes being produced by heating said products of coupling in an alkaline medium with a salt selected from the group consisting copper salts and chromium salts until a metal complex of the product of coupling is formed.

13. The dyestuff metal complexes which comprise a heavy metal and one of a group of monazo compounds, said monazo compounds comprising the residues of diazotized o-amino-phenol-sulfonic acid and as coupling components a residue of the compounds represented by the formula

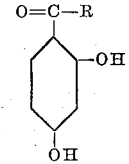

in which R is an aliphatic hydrocarbon radical containing at least six carbons, said complex being produced by heating said product of coupling in an alkaline medium with one of a group consisting of the soluble salts of copper and chromium until a metal-complex is formed.

14. The compound represented by the formula

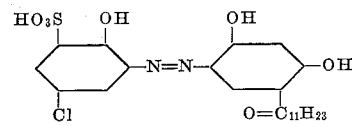

15. A compound represented by the formula

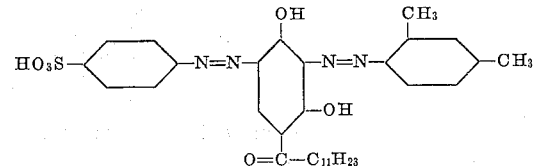

16. The process of making a colored compound which comprises mixing in a cold alkaline reaction medium a diazotized arylamine compound a di-hydroxy phenone which is represented by the formula

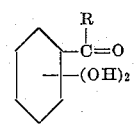

in which R is a radical of one of the compounds from the group consisting of alkyl straight and branched chain compounds having at least 6 carbon atoms, aryl and aralkyl, maintaining the mixture at coupling temperatures until coupling is completed, and separating the product of coupling.

17. The process of making a colored compound which comprises mixing in a cold alkaline reaction medium a diazotized arylamine compound having an aryl group substituted in a position ortho to the azo bridge by one of the group consisting of hydroxy and carboxy and a di-hydroxy phenone which is represented by the formula

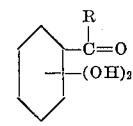

in which R is the radical of one of the compounds from the group consisting of alkyl straight and branched chain compounds having at least 6 carbon atoms, aryl and aralkyl, maintaining the mixture at coupling temperatures until coupling is completed, separating the product of coupling, and heating said product in an alkaline reaction medium with a salt selected from the group consisting of salts of copper and salts of chromium until a metal-complex of the product of coupling is formed.

SWANIE S. ROSSANDER.
HAROLD E. WOODWARD.

CERTIFICATE OF CORRECTION.

Patent No. 2,174,998.　　　　　　　　　　　　　October 3, 1939.

SWANIE S. ROSSANDER, ET AL.

It is hereby certified that error appears in the printed specification of the above numbered patent requiring correction as follows: Page 3, first column, line 34, claim 2, in the formula, for "(HO)" read $(HO)_2$; page 4, second column, line 34, claim 16, after "compound" insert and; and that the said Letters Patent should be read with this correction therein that the same may conform to the record of the case in the Patent Office.

Signed and sealed this 21st day of November, A. D. 1939.

(Seal)

Henry Van Arsdale,
Acting Commissioner of Patents.